Nov. 24, 1936.  F. B. WADEL  2,061,745

ELECTRICAL ADDING MACHINE

Filed Jan. 16, 1933  15 Sheets-Sheet 1

Felix B. Wadel
INVENTOR

ATTORNEY

Nov. 24, 1936.    F. B. WADEL    2,061,745
ELECTRICAL ADDING MACHINE
Filed Jan. 16, 1933    15 Sheets—Sheet 2

Felix B. Wadel
INVENTOR
BY
ATTORNEY

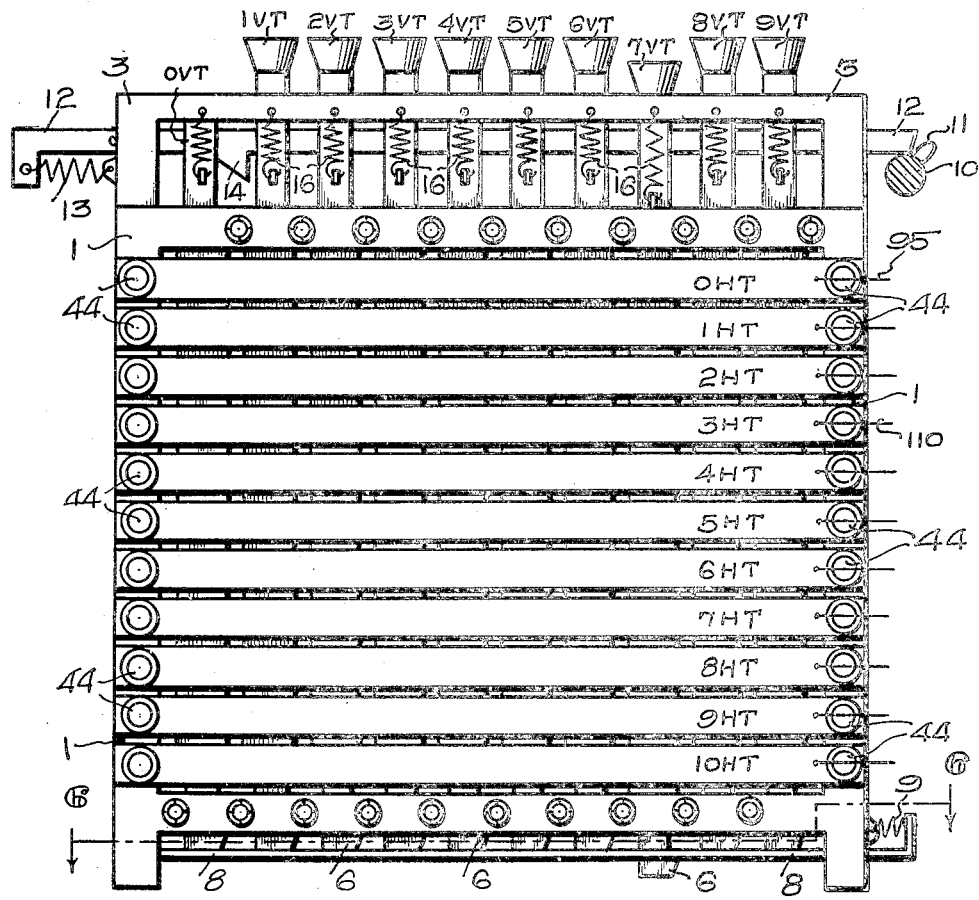

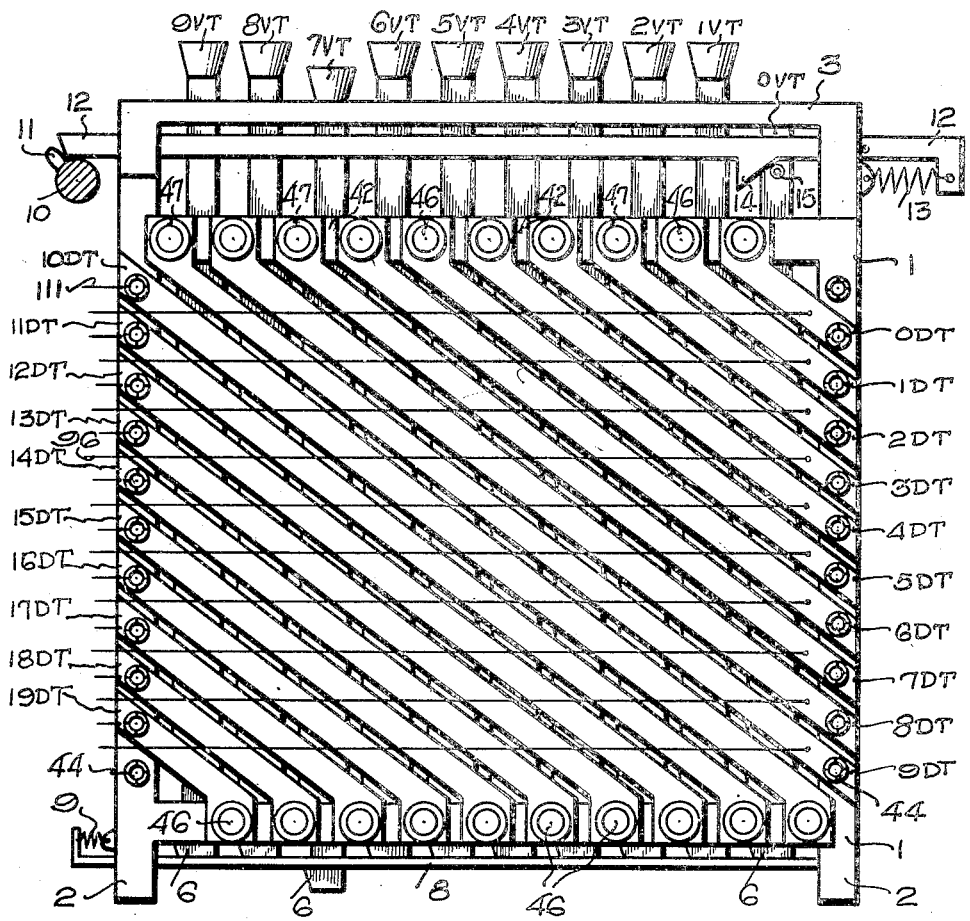
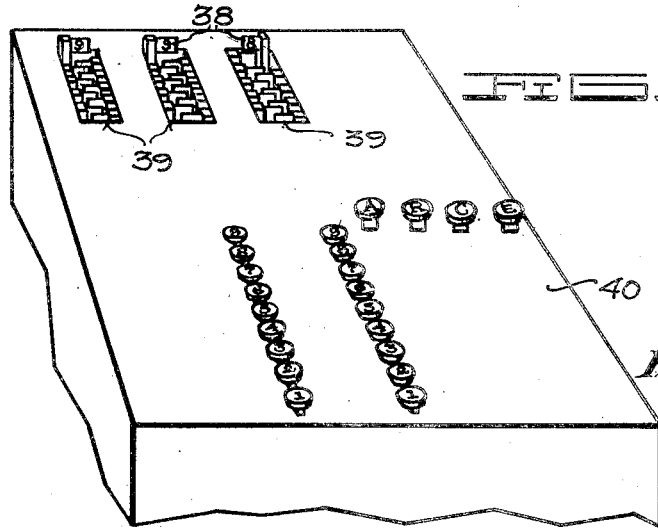

Nov. 24, 1936.  F. B. WADEL  2,061,745
ELECTRICAL ADDING MACHINE
Filed Jan. 16, 1933  15 Sheets—Sheet 5
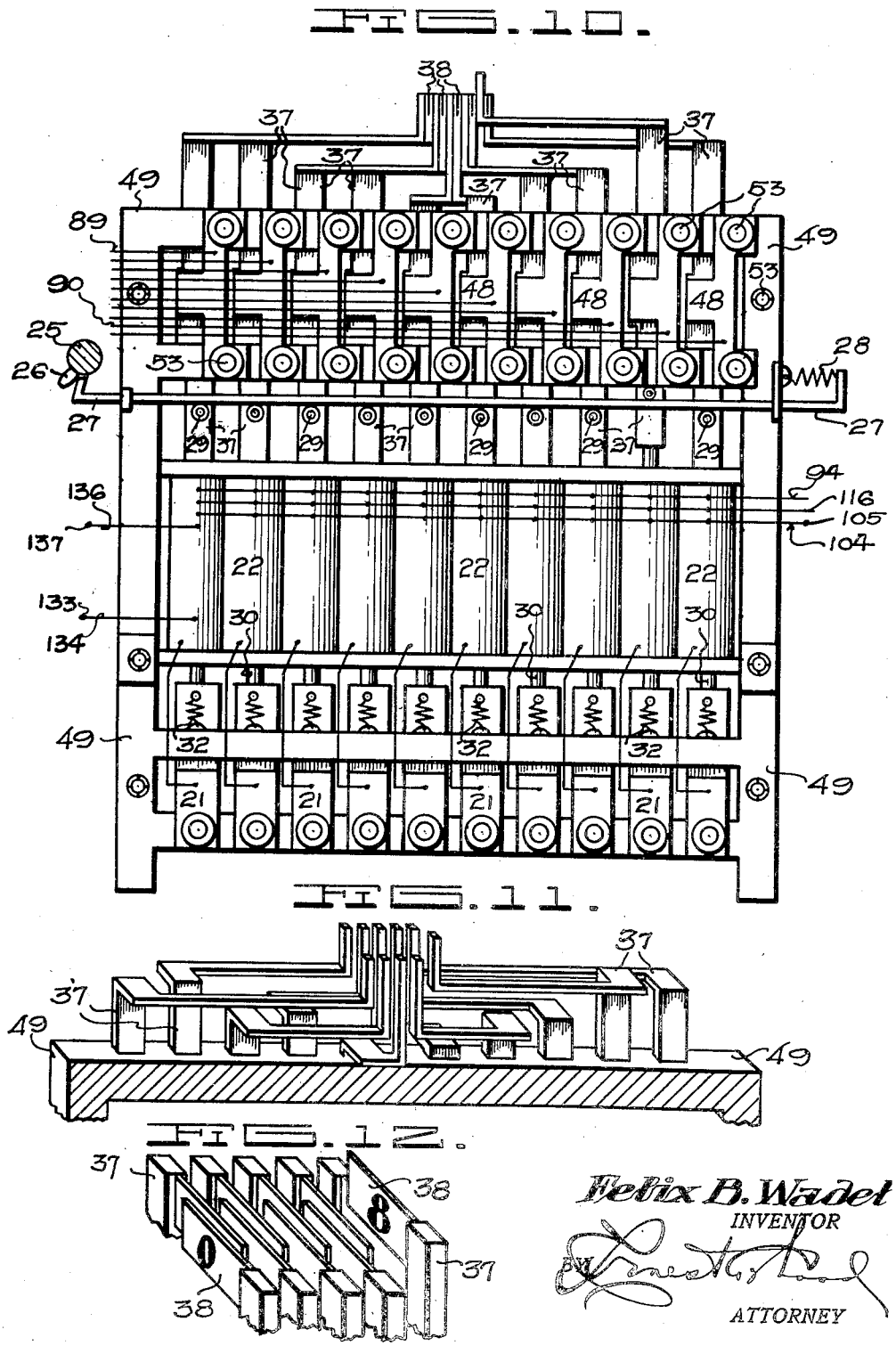

Nov. 24, 1936.  F. B. WADEL  2,061,745
ELECTRICAL ADDING MACHINE
Filed Jan. 16, 1933  15 Sheets-Sheet 6
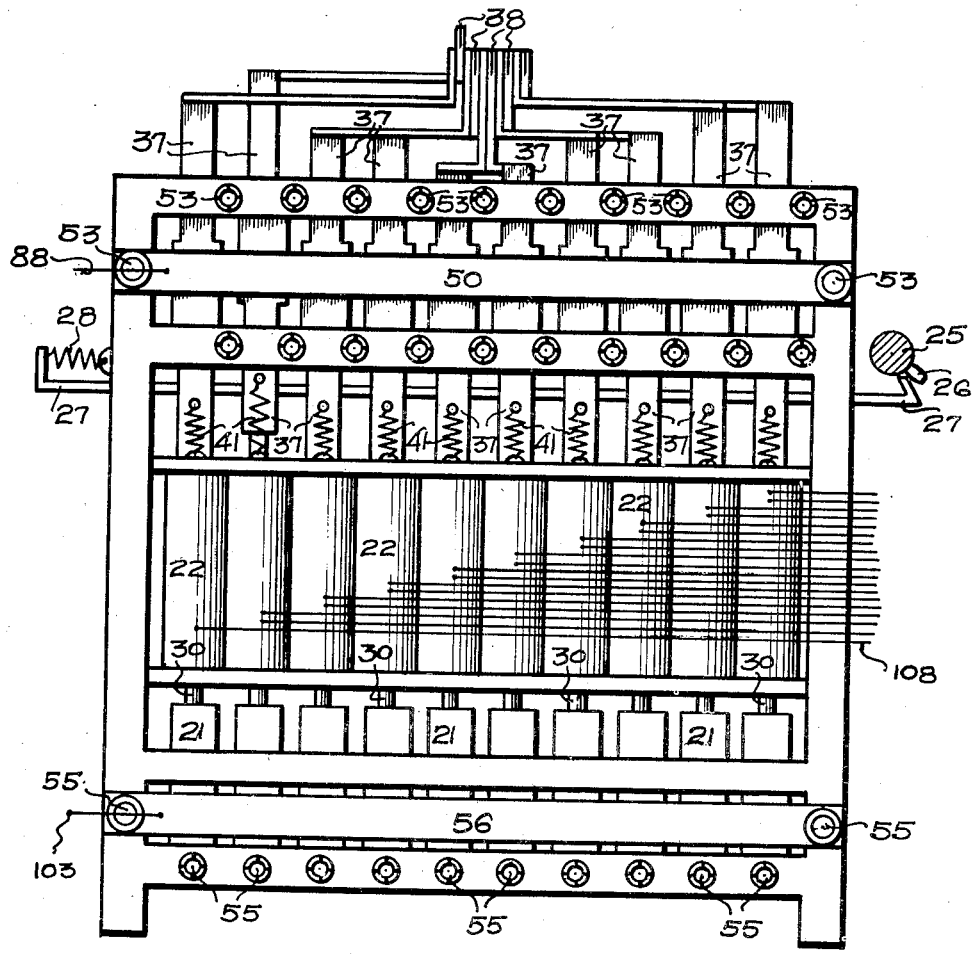
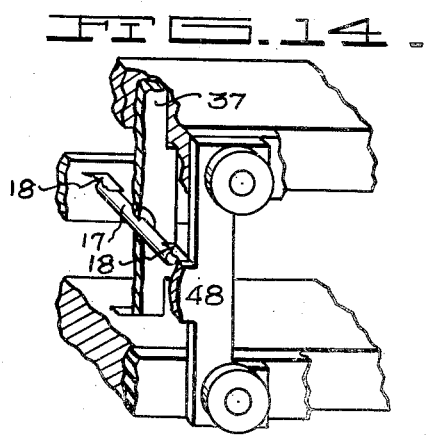
Felix B. Wadel
INVENTOR
ATTORNEY Nov. 24, 1936.  F. B. WADEL  2,061,745

ELECTRICAL ADDING MACHINE

Filed Jan. 16, 1933  15 Sheets-Sheet 7

Felix B. Wadel
INVENTOR

ATTORNEY

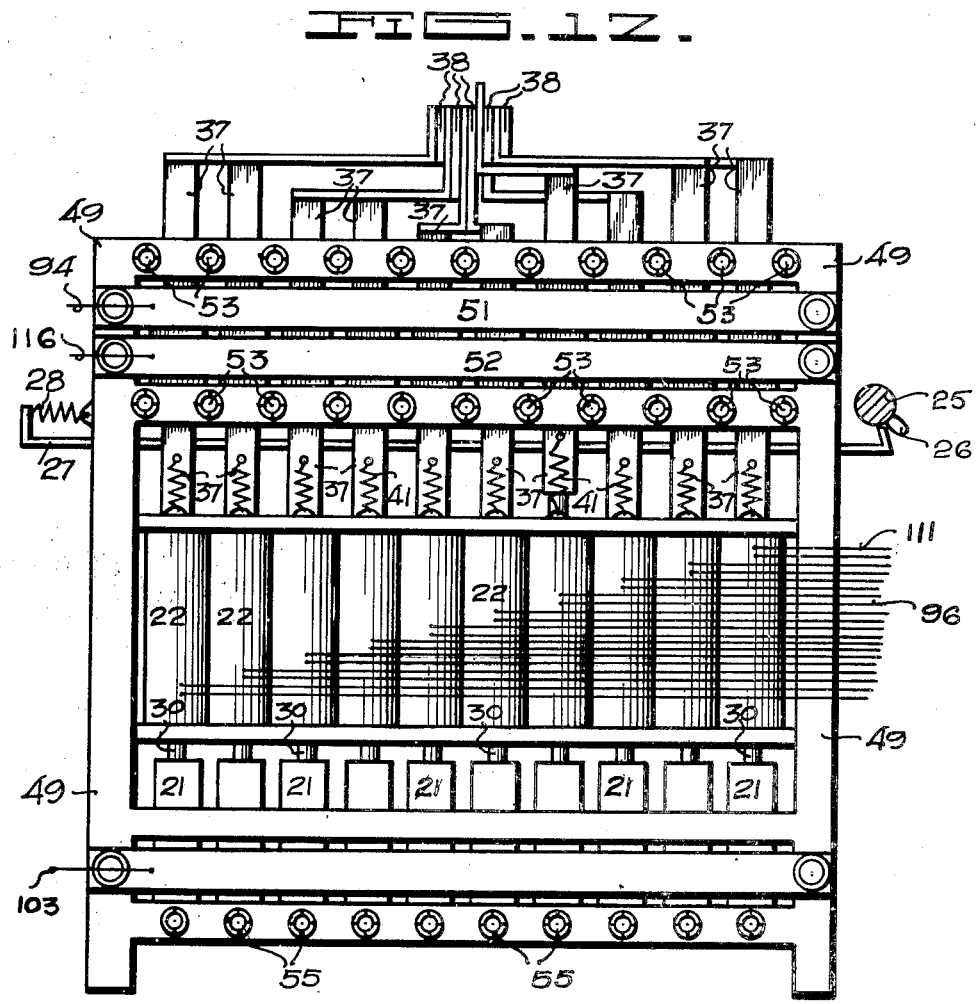
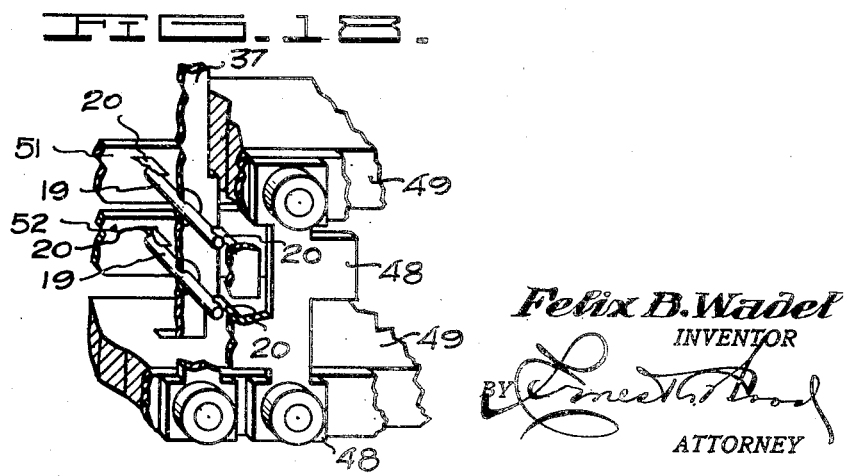

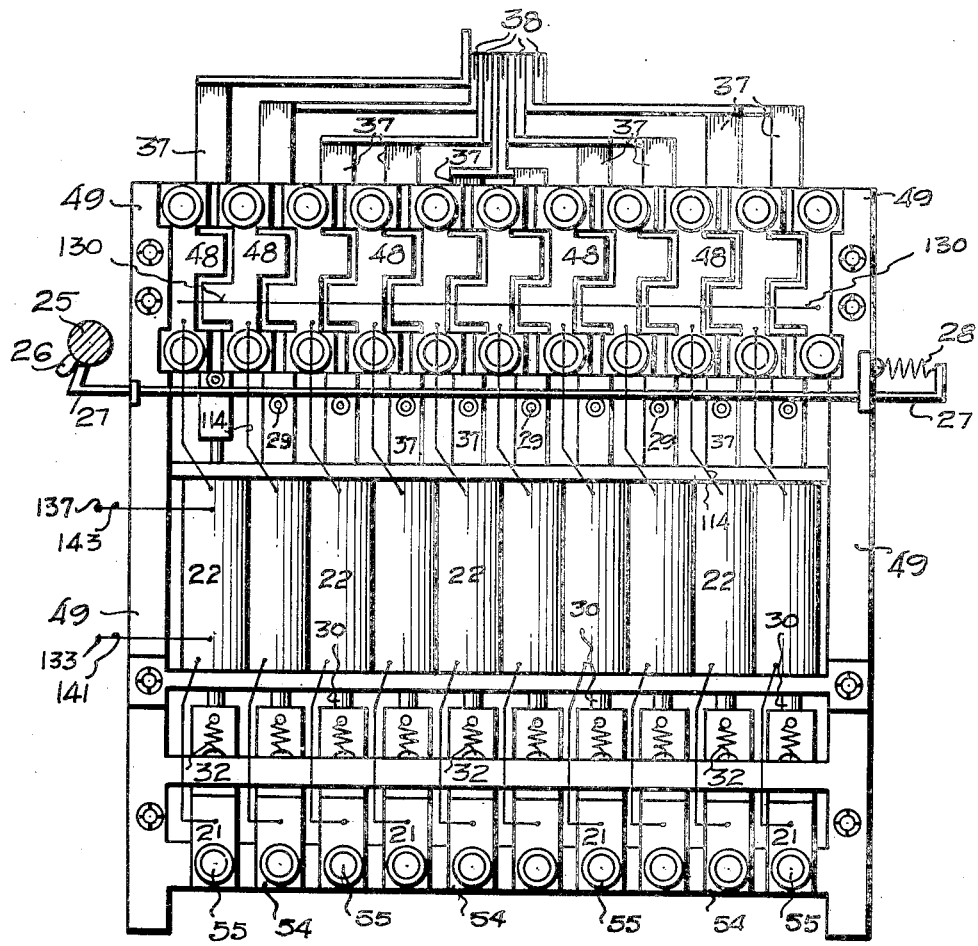
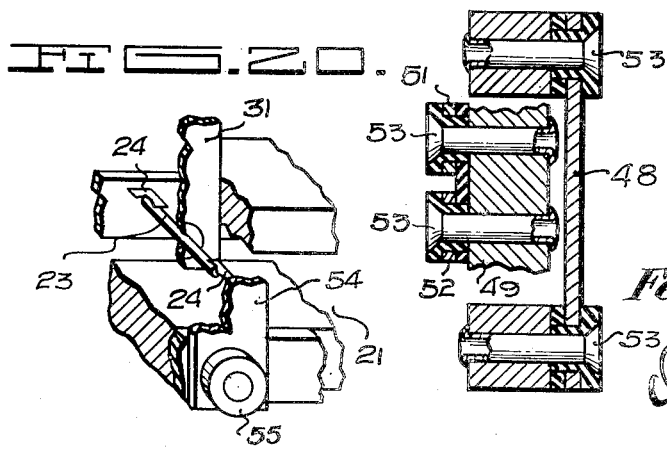

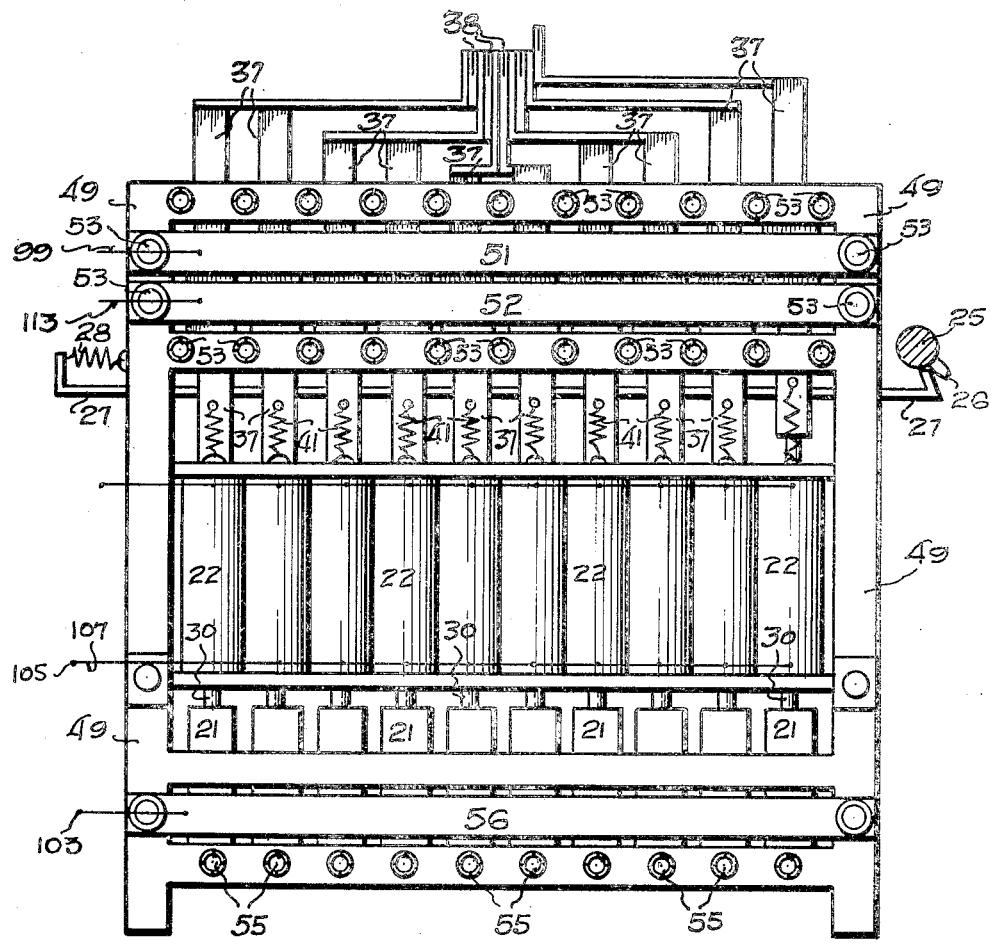

Nov. 24, 1936.   F. B. WADEL   2,061,745
ELECTRICAL ADDING MACHINE
Filed Jan. 16, 1933   15 Sheets-Sheet 11
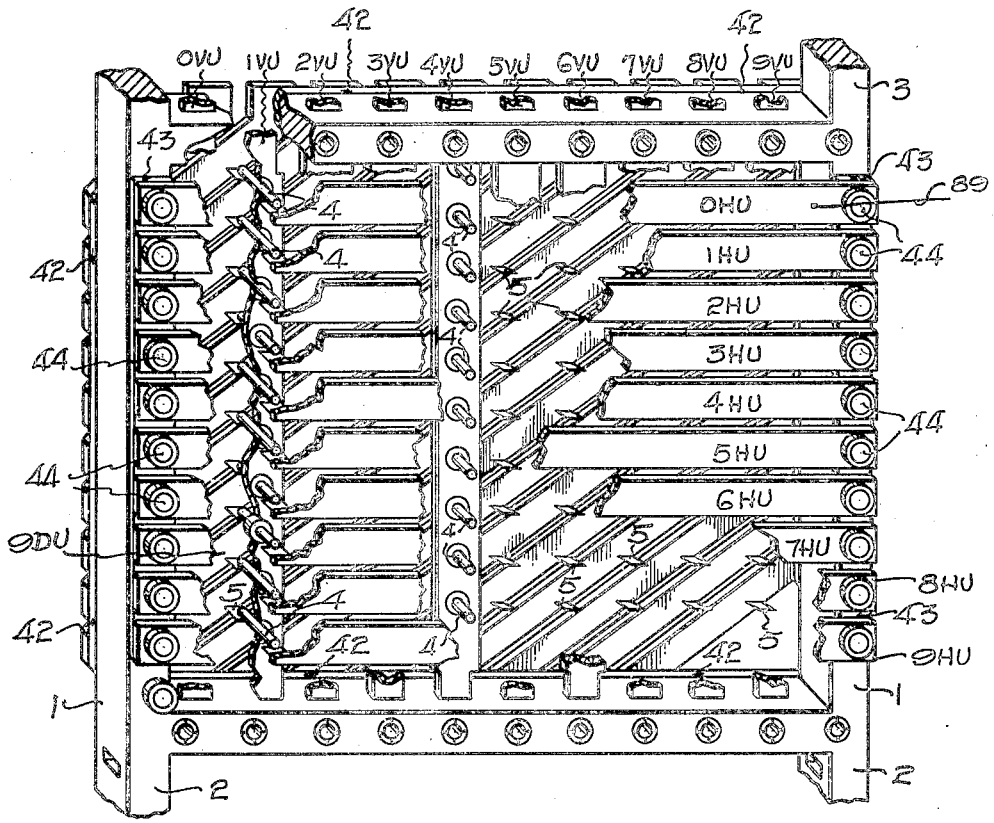
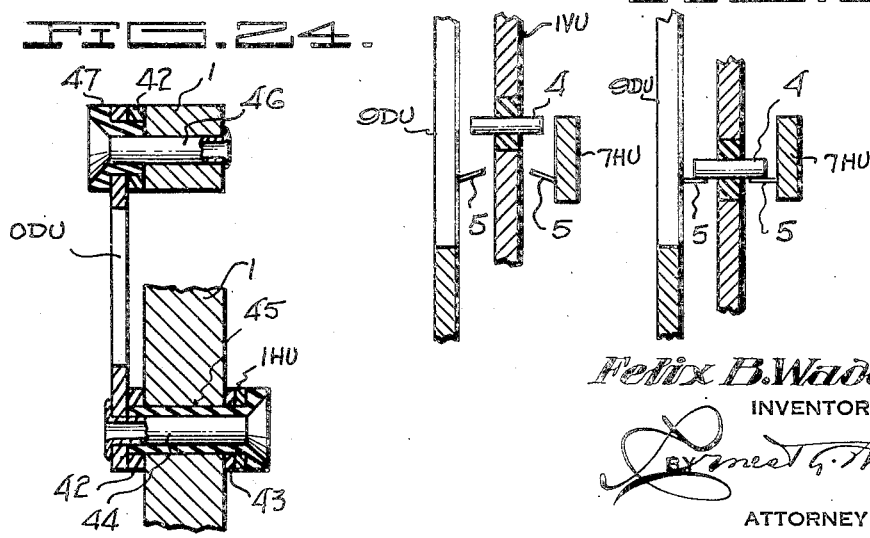
Felix B. Wadel
INVENTOR
ATTORNEY

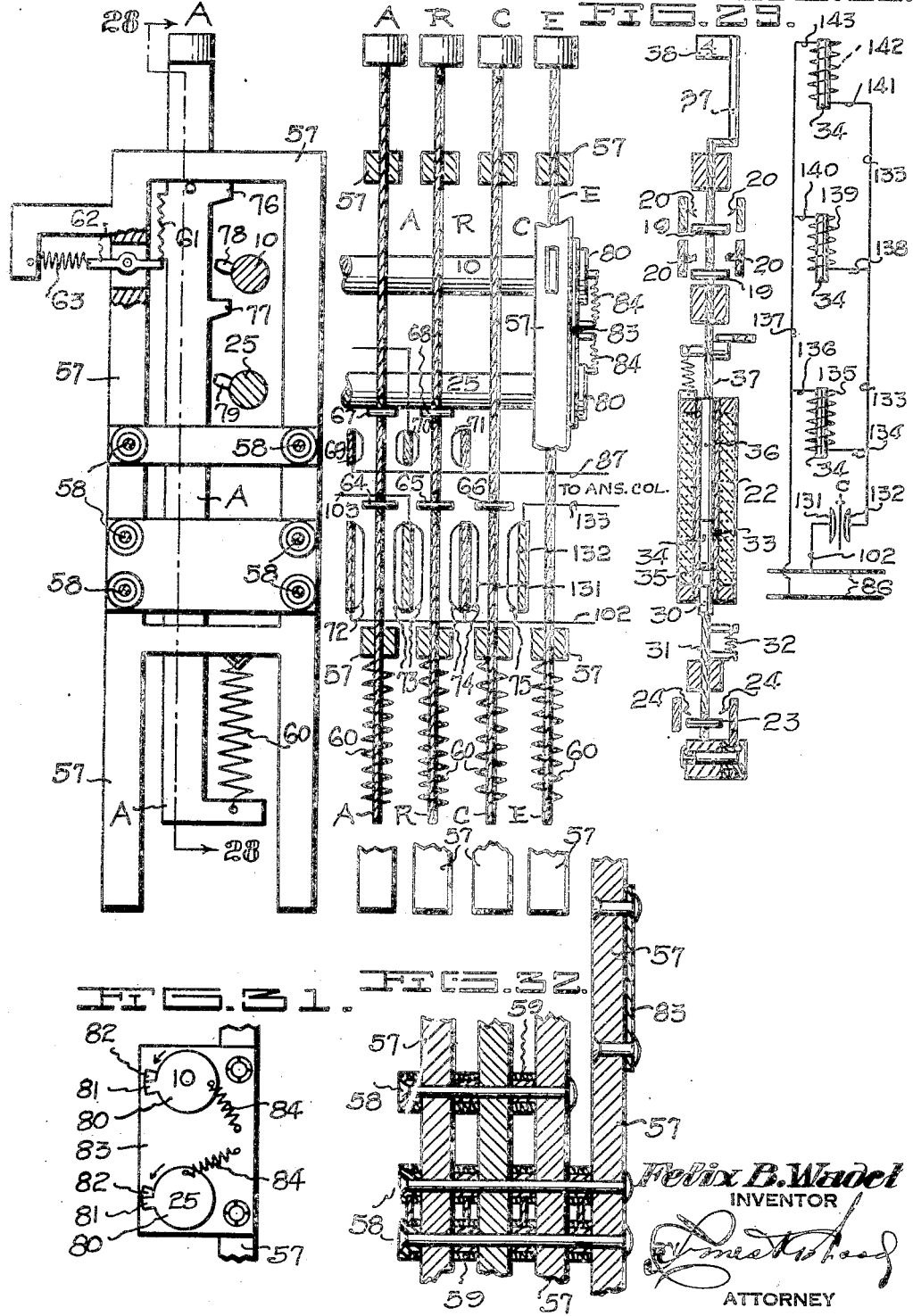

Nov. 24, 1936.  F. B. WADEL  2,061,745
ELECTRICAL ADDING MACHINE
Filed Jan. 16, 1933  15 Sheets-Sheet 13
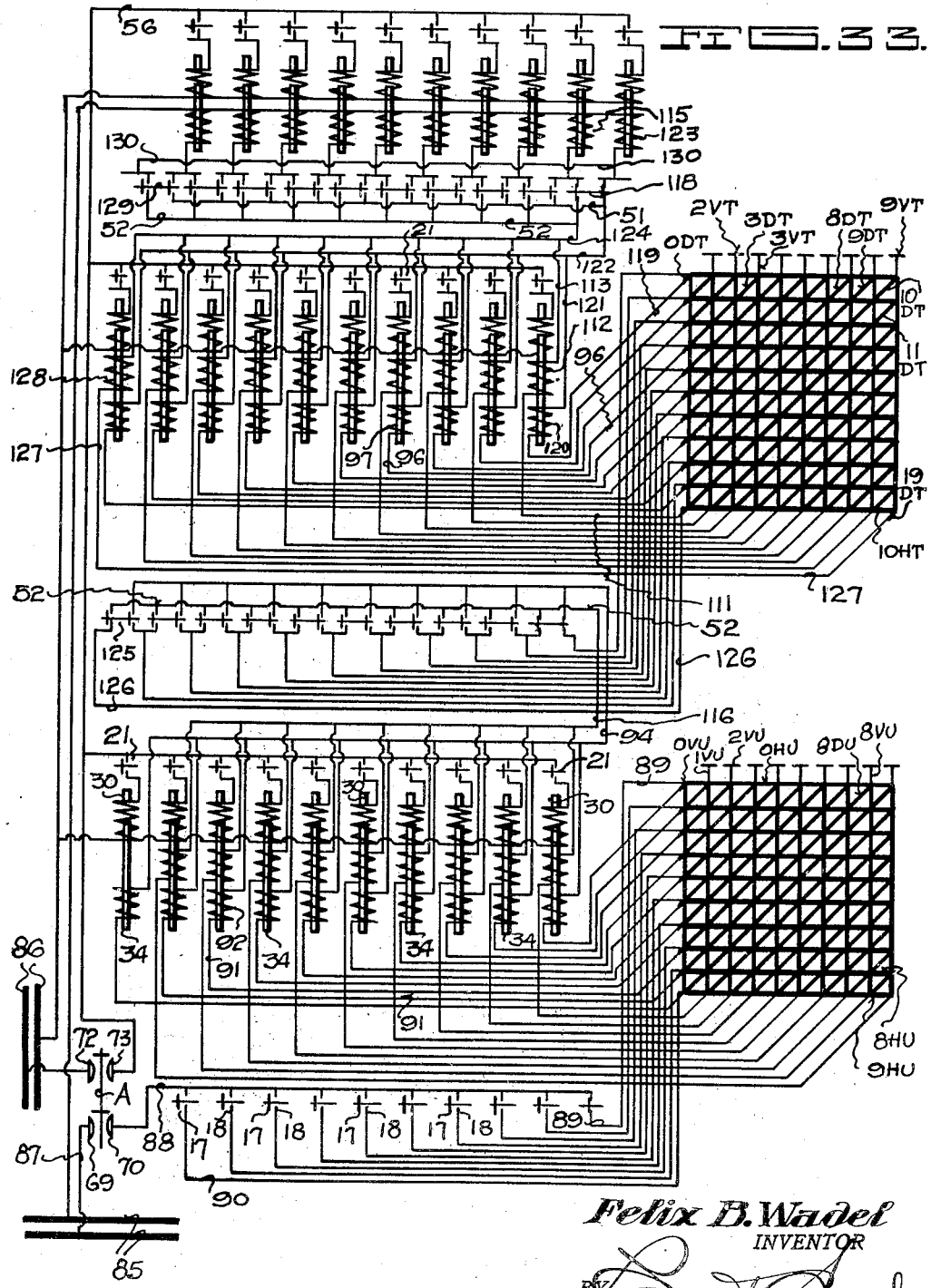
Felix B. Wadel
INVENTOR
ATTORNEY

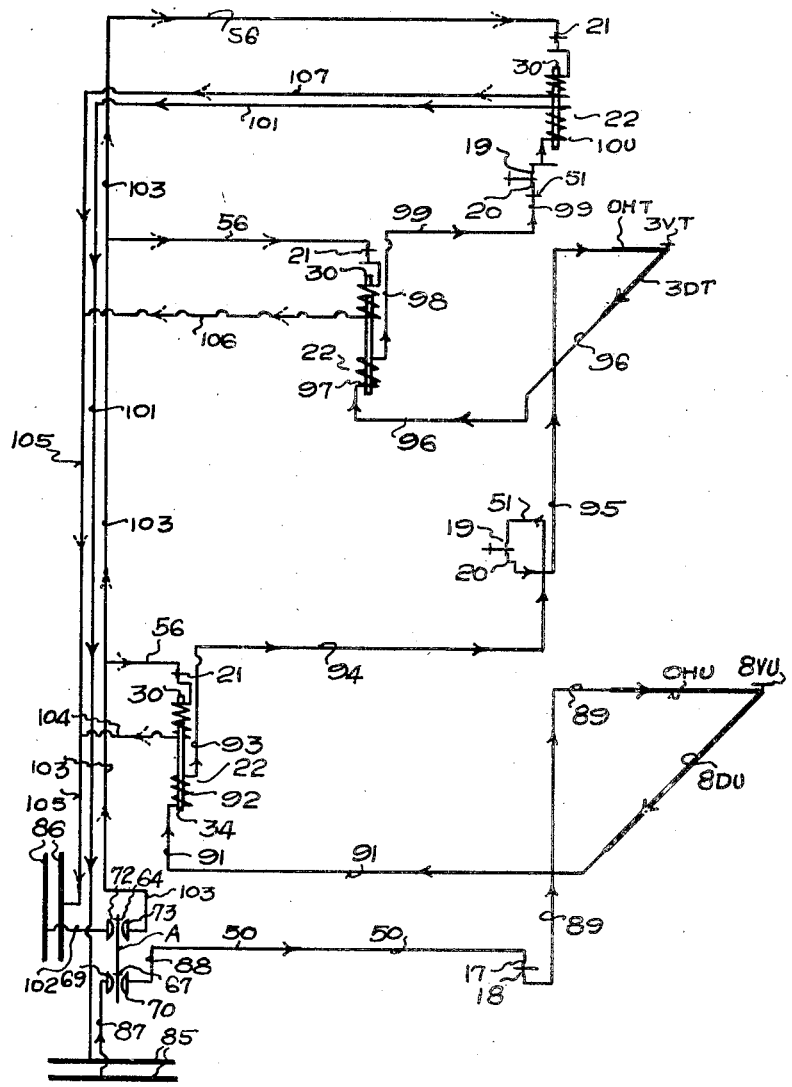

Nov. 24, 1936.　　　F. B. WADEL　　　2,061,745
ELECTRICAL ADDING MACHINE
Filed Jan. 16, 1933　　　15 Sheets-Sheet 15

Patented Nov. 24, 1936

2,061,745

UNITED STATES PATENT OFFICE 2,061,745

ELECTRICAL ADDING MACHINE

Felix B. Wadel, Tyler, Tex.

Application January 16, 1933, Serial No. 651,995

6 Claims. (Cl. 235—61)

This invention relates to adding machines and it has particular reference to electrically operated adding machines.

The principal object of the invention is to provide a machine of the character specified, capable of increasing the speed of addition, yet reducing materially the number of moving parts ordinarily required in the construction of mechanical machines.

Another object of the invention is to provide an electrically operated adding machine, the design and arrangement of parts being such that the distance of travel of the moving parts is minimized thereby making for simplicity of construction, speed of operation and simplifying the process of securing the answer.

Yet another object of the invention is to provide a machine for adding in which the answer is obtained through a series of electrical circuits, selective ones being closed by the depression of a key and interdependent circuits being so closed as to actuate an answer exhibiting means.

Broadly, the invention comprehends the provision of an electrical adding machine having a series of units, each of which contains a group of keys and an answer exhibiting means both embraced by a plurality of parallel bars serving as supports for contacts, the latter being actuated by the keys and the answer exhibiting means to close electric circuits. Moreover, the invention includes suitable means operating in coordination with the circuits, whereby the machine is cleared, errors corrected, the repetition of items performed and addition effected.

With the foregoing objects as paramount, the invention has particular reference to its salient features of construction and arrangement of parts, which will become manifest as the description proceeds, taken in connection with the accompanying drawings, wherein:—

Figure 5 is a side elevation of the right side of the tens keys column.

Figure 6 is a view taken on line 6—6 of Figure 5.

Figure 7 is a fragmentary detail view of the key stem locking bar.

Figure 8 is a side elevation of the tens keys column from the left.

Figure 9 is a perspective view of the machine showing the relative position of the keys and the answer exhibiting means.

Figure 10 is a side elevation of the units answer exhibiting means from the right.

Figure 11 is a fragmentary perspective view of the answer exhibiting bars with the answer tabs removed.

Figure 12 is a fragmentary perspective view of the answer exhibiting bars with the answer tabs in place.

Figure 13 is a side elevation of the units answer exhibiting means from the left.

Figure 14 is a fragmentary perspective view showing the manner by which contacts are made by the answer bars in the units column.

Figure 17 is a side elevation of the answer exhibiting means in the tens column from the left.

Figure 18 is a fragmentary view in perspective showing the manner in which contacts are made by the answer bars in the tens column or any succeeding column.

Figure 19 is a side elevation of the answer exhibiting means of the hundreds column from the right.

Figure 20 is a fragmentary perspective view showing the manner in which contacts are made by the answer retaining or relay bars in any column.

Figure 21 is a fragmentary detail view showing the manner in which the parallel contact supporting bars are assembled on the frame.

Figure 22 is a side elevation of the answer exhibiting means of the hundreds column from the left.

Figure 23 is a perspective view partly broken away showing the manner in which contacts are made by the key stems in the units column.

Figure 24 is a fragmentary detail view partly in cross section showing the manner in which the parallel contact supporting bars are assembled upon and insulated from the frame.

Figure 25 is a detail view, partly in cross section, showing one of the key stems in raised position with the contacts open.

Figure 26 is a view similar to Figure 25 showing the contacts closed.

Figure 27 is a side elevation showing in detail the addition key.

Figure 28 is an end elevation partly in cross section with the frame partly broken away showing the addition, repeat, clearing and error keys.

Figure 29 is a detail view, partly in cross section, showing the answer exhibiting means in the tens or any succeeding column.

Figure 30 is a wiring diagram of the clearing means.

Figure 31 is a detail view in the direction of the arrows on line 31—31 on Figure 28.

Figure 32 is a detail view showing the manner in which the contact supporting bars shown in Figure 28 are assembled upon and insulated from the frame and from each other.

Figure 33 is a wiring diagram including symbolically the parallel bars, key stems, answer bars and answer retaining relays, the clearing circuit being omitted but shown in Figure 30.

Figure 34 shows the circuits selected for placing a definite quantity in the machine.

Continuing with a more detailed description of the drawings, it may be stated that in view of certain peculiarities of the design it has been found desirable to designate some of the parts by characters of reference suggestive of their location in the machine, function and relationship with companion parts. For example, the machine has embodied in its structure, parallel horizontal bars which may be referred to from time to time as the contact supporting bars. These bars will be designated "H" preceded by the numeral particularly affected by the bar, and followed by "U" if the horizontal bar is embodied in the units bank of keys and followed by "t" if in the tens bank of keys. This is true also in describing the diagonal bars opposing the horizontal bars, the former being designated by "D" preceded by a definite numeral and followed by the first letter of the bank of which it forms a part.

The key stems being vertical and interposed between the horizontal and diagonal bars are designated "V", preceded by a definite numeral and followed by "U" or "T", suggesting the units or tens bank.

The foregoing method of identification has been adopted to facilitate the description and an understanding of the construction and operation of the machine.

Figure 1:
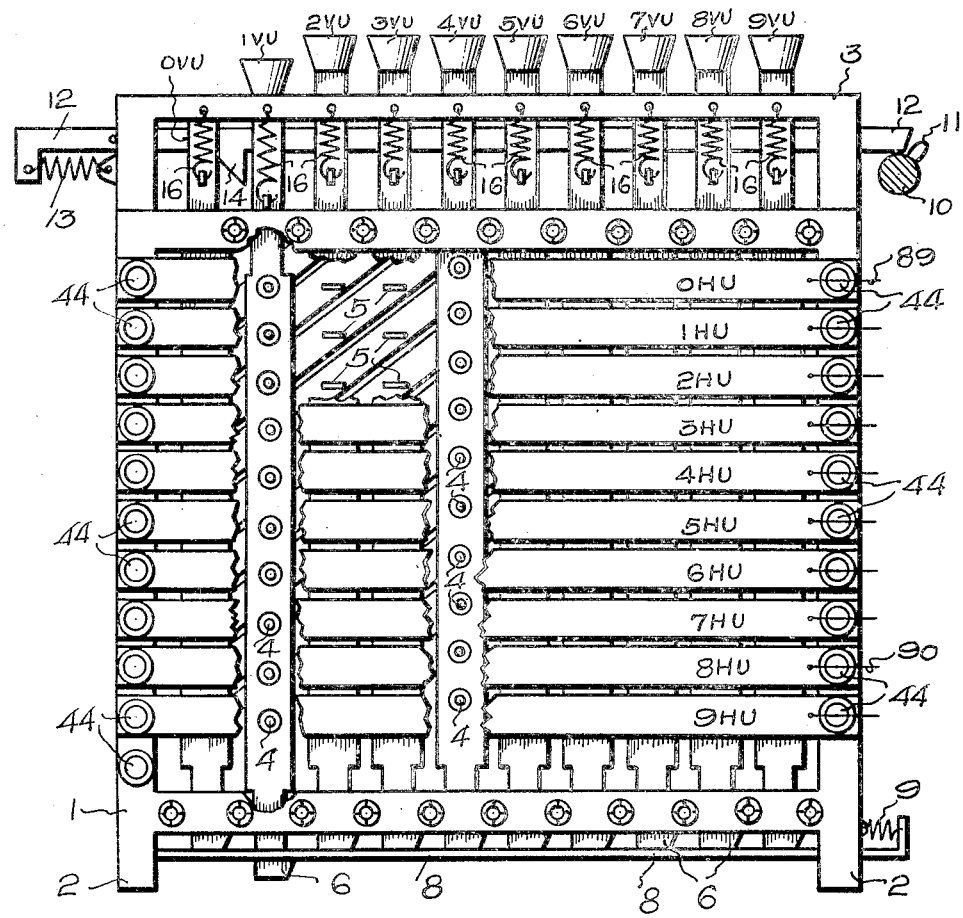
Figure 1 is a side elevation of the right side of the units keys column with portions broken away.
Figure 4:
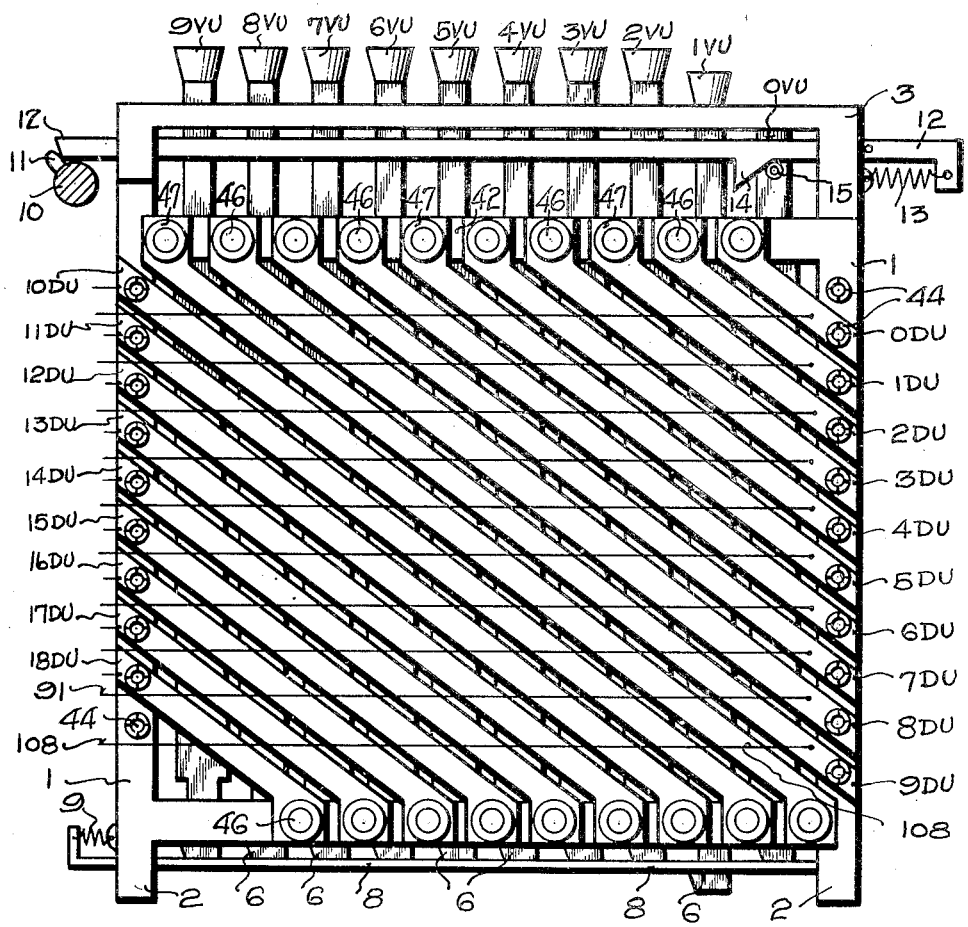
Figure 4 is a side elevation of the left side of the units keys column.

The machine is composed of a units column or key bank shown in Figures 1 and 4 illustrating the right and left hand sides respectively. A frame 1 is provided resting upon legs 2 and having an integral key stem guide frame 3 disposed thereon and through which the several key stems pass and which key stems will be identified presently.

On the right side of the frame 1 is disposed a series of spaced, horizontal bars, each of which has a definite purpose when the machine is operated as will become apparent presently. On the opposite or left side of the frame 1 is a plurality of diagonal bars, each of which has a definite function. Between the horizontal and diagonal bars, the several key stems are disposed vertically in spaced relationship, each of which has extending therethrough a series of spaced insulated pins 4. These pins are adapted to engage flexible contact points 5 shown in Figure 1 and in detail in Figures 25 and 26. Thus, when a key is depressed, the contact pins 4 make contact with the flexible contact points 5 on both the diagonal and horizontal bars. This method of making contact is also borne out in Figure 23 which is a fragmentary perspective view of the right side of the units column.

Figures 2, 3:
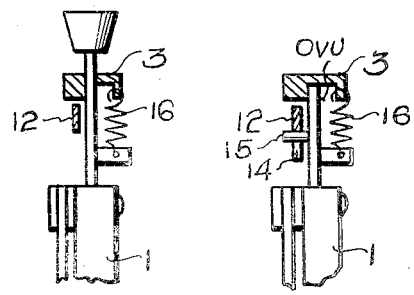
Figure 2 is a fragmentary detail of one of the keys.
Figure 3 is a fragmentary detail of the key stem corresponding to the zero.

When any one of the several keys is depressed, the lower end of the key stem, being formed with a hook 6 as shown in detail in Figure 7, enters a slot 7 in a key stem lock bar 8. This bar 8 as apparent in the detail view, Figure 6, is movable longitudinally and yields to the bevel on the hook 6 of the key stem and when displaced thereby, it is returned to normal position by the spring 9 connecting its end to one side of the frame 1. In order to release any or all keys locked by the bar 8, the key stem at the extreme left of the column shown in Figure 1, is depressed. This key stem does not pass through the key stem guide frame 3, as shown in Figure 3, but is supported by the frame 1 only. This key stem has insulated pins 4 extending therethrough, similar to those of the other key stems. This is accomplished by rotating a shaft 10, which carries a lug or tooth 11, the latter engaging an extended end of a key release bar 12 and pushes the bar against the resistance of a spring 13, which returns the bar to normal position. As apparent in Figures 1, 3, 4, 5 and 8, the bar 12 carries a projection 14 which, when the bar is moved engages a small roller 15 carried by the short key stem at the extreme left of the column in Figure 1 and moves the same downward which action will obviously move the key stem lock bar 8 and release any depressed key stem as explained. The short key stem then remains in down position with contacts made by its pins 4 and the corresponding points 5, until it is released by the depression of another key. See Figure 7. Each of the key stems is returned to normal position by means of springs 16, one end being attached to the key stem near its upper end and the other being attached underneath the key stem guide frame 3.

The foregoing brief description of construction is given to facilitate an understanding of the definite function of the horizontal and diagonal bars and the key stems, which as stated previously, will bear only characters of reference suggestive of their function.

An example of the keyboard and answer exhibiting mechanism is shown in Figure 9, which includes the addition, repeating, clearing and error keys. However, only the units and tens keys are illustrated but it is obvious that any number of columns may be added, the figure being merely illustrative. When the operator desires to add for example, 71 to 38, the "3" key is depressed in the tens column which is on the left in Figure 9 and the 8 key in the units column. The addition key is then depressed which causes "38" to be exhibited. "71" is then similarly placed in the machine and the addition key again depressed whereupon the answer "109" is exhibited.

The answer exhibiting mechanism is shown in Figures 9 to 22 inclusive, the exhibiting means proper being illustrated in detail in Figures 11 and 12. It will be noted in these figures that although similar to the units and tens columns just described briefly, the columns shown in the figures above do not have the horizontal and diagonal bars nor the key stems but instead are supplied with answer bars disposed similarly to the key stems and will be identified by suggestive characters of reference in the course of the general description to follow presently.

When one of the keys in the units or tens column is depressed, the several pins 4 simultaneously engage the several spring contacts 5 extending inwardly from the horizontal and diagonal bars as shown in Figures 25 and 26. An electric circuit is thus completed, as will be hereinafter explained. However, in the answer exhibiting mechanism the exhibiting bars make contact in the upward movement as shown in Figure 14, for the units column through the medium of cross pins 17 passing through the answer exhibiting bar and whose ends engage spring contacts 18 affixed to and extending inwardly from a horizontal bar on one side and short vertical bars shown in Figures 10, 13 and 14 near the top of the column. It will be noted that the foregoing applies only in the units column shown in the above figures, the tens and succeeding columns have two horizontal bars and a series of vertical bars, although contact is made in substantially the same manner as in the units column. In Figure 18 is shown the manner in which contact is made in the tens and succeeding columns. Instead of a single pin through each answer bar, two pins 19 for each bar are provided which engage spring contacts 20, the latter being situated one upon each of the horizontal bars and one being carried by each of two adjacent vertical bars.

Situated near the bottom of each of the several answer columns illustrated in Figures 10 to 22 inclusive is a series of relays shown in detail in Figure 20. When the machine is operated a selected one of the relays 21 is actuated by a companion magnet 22 which causes contact between the cross pin 23 and contact points 24 of the relay 21 shown in Figure 20.

After depression of selected keys, say "38", the addition key is depressed as above explained and when the addition key is near the bottom of its stroke, provisions are made for rotating a shaft 25, which carries a lug 26 adapted to engage the upturned end of an answer retaining bar 27 against the resistance of a spring 28. This bar has a notched edge as shown in detail in Figure 16 which inoperatively reposes above a series of pins or small rollers 29 except one which holds an answer bar in raised position, thereby making contacts which are effective in establishing current through the machine. At the beginning of an operation, when the machine is clear, the zero answer bar, with its roller, is in raised position.

Figure 15:
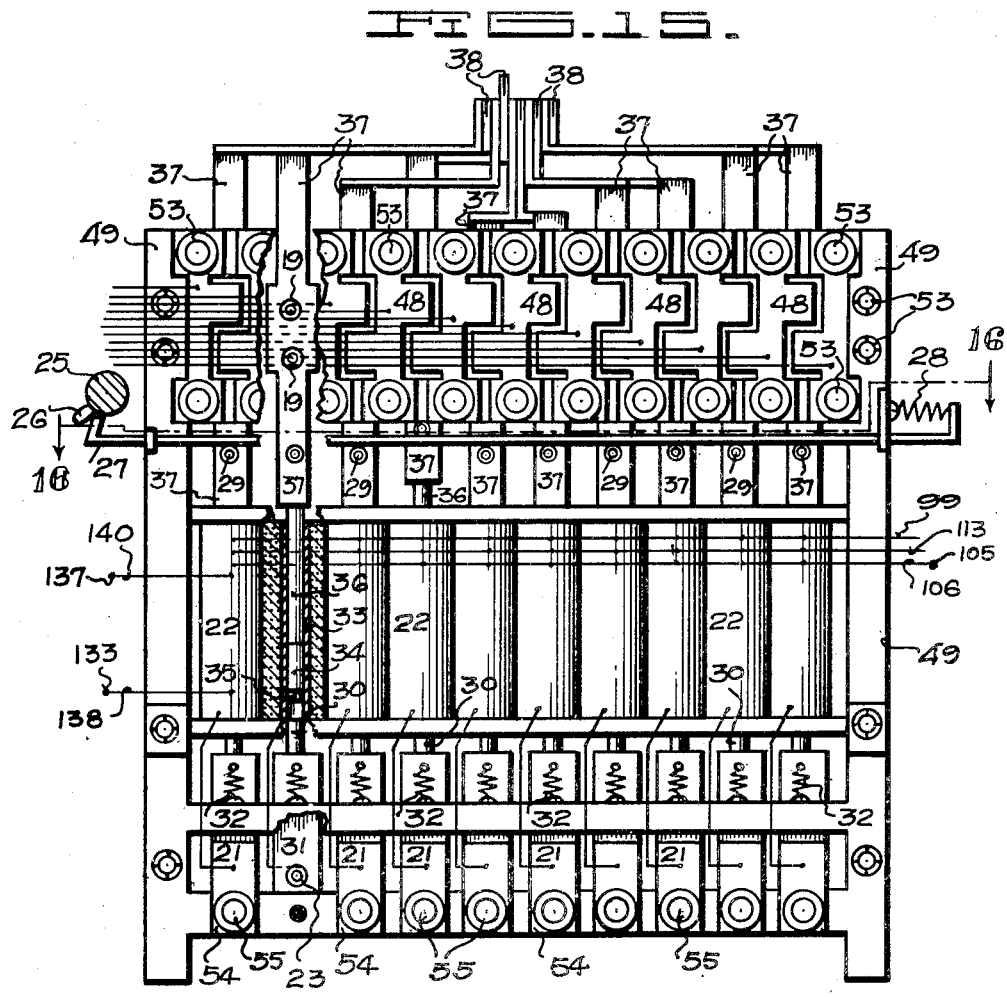
Figure 15 is a side elevation of the answer exhibiting means in the tens column from the right, showing one of the units in fragmentary cross section.
Figure 16:
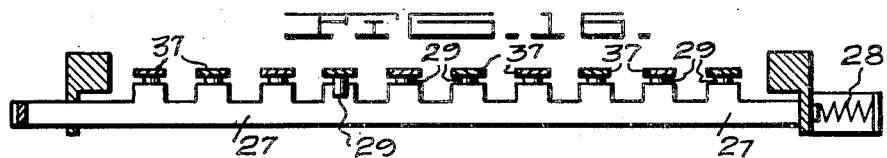
Figure 16 is a detail view on line 16—16 on Figure 15.

Referring to Figure 15 and specifically to the cut away portion showing the interior construction of one of the magnets 22, an armature 30 is provided, which is attached to a relay stem 31 shown in Figures 15, 20 and 29. The pin 23, passes through this stem 31 and engages the contact points 24, upon upward movement of a relay stem 31. It will be noted that the stems 31 are held normally inoperative by springs 32.

Each of the magnets 22 has a tubular ferrous core 33 shown only in Figures 15 and 29 in which operates an armature 34 as well as the relay armature 30, and between these armatures there is interposed a non-ferrous plug 35 which is rigidly attached to the ferrous core 33. The purpose of this plug is to separate the armatures 30 and 34 at all times, to prevent their clinging to each other through magnetic attraction. The ferrous cores 33 also have therein non-ferrous guide rods 36 which serve to connect the armatures 34 with the answer exhibiting bars 37. It will be noted that one of the magnets 22 is shown in the cut away portion in Figure 15 as having only one winding around the ferrous core 33. However, one of the magnets, particularly the one shown at the extreme left in Figure 15 is provided with four separate windings, the reason for which will be given in the course of the description of operation. The remaining magnets are provided with three separate windings and which will also be explained in the description of operation.

The upper ends of the answer exhibiting bars 37 are so shaped that they may be grouped in close relationship near the middle of the column for the purpose of conserving space and to facilitate reading of the answer tabs 38 which are visible in the openings 39 in the housing 40 shown only in Figure 9.

Upon energization of a selected magnet 22 the relay armature 30 is pulled up against the tension of the spring 32 thereby closing the relay points 24 as shown in Figure 20 and which are disposed in the lower portion of the answer exhibiting column.

Upon longitudinal movement of the answer retaining bar 27 by reason of rotation of the shaft 25 upon depressing the addition key, all of the rollers 29, attached to the answer bars 37 are free to move upward, but movement of an answer bar occurs only when the magnet surrounding the armature of a selected answer bar 37 is energized. It will be understood that any other answer bar whose roller 29 is disposed above the bar 27 will be returned to normal position by means of springs 41.

The foregoing mentions briefly the horizontal and diagonal bars on either side of the frame 1 and which bars will be more fully described presently but it is desirable to mention at this point that these bars are peculiarly insulated from the frame. The method of insulating is shown in detail particularly in Figure 24 which figure also shows portions of the frame 1 in cross section. The diagonal bar, which will be identified later is insulated from the frame 1 on one side by insulating strips 42. Similar insulating strips 43 are employed to insulate from the frame the horizontal bars, which will also be identified later. It has been found convenient to perforate the frame 1 and pass through the perforations rivets 44, which serve the dual purpose of holding the horizontal bars and the diagonal bars onto the frame although it will be understood that these bars are insulated from each other by fibre tubes 45. The tube 45 also insulates the rivet 44 from the frame 1.

In Figures 4, 8 and 24 is shown a row of rivets 46 which connect certain of the diagonal bars to the top and bottom of the frame 1.

These bars are likewise insulated from the frame 1 by the strips 42 previously mentioned. A fibre bushing 47 is interposed between the rivet 46 and the bar as particularly shown in Figure 24 to insulate the rivet from the bar.

Figure 21 shows the method of insulating the short vertical members or bars 48 near the top of the answer exhibiting column, from the frame, which latter in the present case will be identified by the character 49. It will be noted that the units answer column shown in Figure 13 has only one horizontal bar 50 across the top while the tens and succeeding columns have two bars 51 and 52, hence the Figure 21 is a section taken vertically through any of the latter columns. Rivets 53 effectively hold the short vertical bars 48, horizontal bars 50, 51 and 52 onto the frame.

In a similar manner, short vertical bars 54 arranged along the bottom of the frame 49 in spaced relationship are insulated from the frame and held thereon by means of rivets 55, which latter also serve the purpose of securing the opposing horizontal bar 56 to the frame 49.

In the foregoing description, brief mention was made of the addition, repeat, clearing and error keys shown in the keyboard assembly in Figure 9. The construction of this assembly is shown in detail in Figures 27, 28, 31 and 32. For the sake of clarity, each unit designated, for example "A" for the addition key, "R" for the repeat key, "C" for clearing key and "E" for the error key. A side view of the addition key mechanism is shown in Figure 27 which is representative of the companion keys "R", "C" and "E" shown in Figure 28 with the exception of minor details to become apparent presently.

Frames 57 carry the four key stems "A", "R", "C" and "E", and are joined together by rivets 58 as shown in Figure 32 and spaced apart by suitable insulating washers 59. Each of the four key stems are held in normal extended position by a spring 60 connected to their lower ends. A cycle ratchet is supplied for each of the four key stems and consists of the conventional ratchet 61 and detent 62 under the control of a spring 63. This cycle ratchet compels the key stem to make a complete stroke before reversing its direction of travel.

It is necessary for the proper control of operating current to provide the keys "A", "R", and "C" with suitable contact pins 64, 65 and 66 respectively, and the keys "A", and "R" with contact pins 67 and 68, as shown in Figure 28. The pins 67 and 68 are insulated from their key stems and are adapted to engage spring contacts 69, 70, and 71 respectively. Contact pins 64, 65 and 66 are also insulated from the key stems and upon depression of the keys are adapted to engage spring contacts 72, 73, 74 and 75.

The "A" key shown in Figure 27 is provided with two projections 76 and 77. It will be remembered that brief mention was made in the foregoing of the purpose of the shafts 10 and 25 and the effect thereon by movement of the addition key. It is now pointed out that when this key, shown in Figure 27, is depressed, the projection 76 will engage a lug 78 carried by the shaft 10 and will thereby rotate the latter, as stated previously and will cause the lug 11 carried also by the shaft 10 to engage the extended end of the longitudinally movable bar 12 and move this bar against the resistance of the spring 13 (see Figure 4) and thereby release any depressed key.

At the same time, the projection 77 engages the lug 79 carried by the shaft 25, which, it will be remembered, is effective in actuating the answer retaining bar 27, shown in Figures 10, 19 and 22, thereby allowing an answer to be exhibited. Rotation of the shaft 25 by reason of the depression of the key "A" causes the lug 26 carried by the shaft 25 thereby to move against the upturned end of the bar 27, moving the same longitudinally to permit of movement of a selected one of the answer exhibiting bars 37 upward by magnetic action and others downward by spring action.

The "R" or repeat key stem is provided with only one projection comparable to the projection 77 carried by the "A" key. Since there is no projection 76 thereon, shaft 10 is not rotated thereby, hence the bar 12 is not moved and any number placed in the machine may be added a desired number of times merely by successive depressions of the "R" key. However, shaft 25 is rotated to exhibit each new answer.

The mechanical construction of the "C" or clearing key is identical to that of the "R" key, but only one contact is made as against two in the preceding instances, this one contact being made between the contact pin 66 and spring contacts 74 and 75. The purpose of this contact will be explained later.

The "E" or error key of the assembly has only a single projection comparable to the projection 76 carried by the "A" key. This projection serves the function of rotating the shaft 10 for the purpose of clearing the keyboard of a number which has been placed therein by error.

The shafts 10 and 25 as apparent in Figure 31, have affixed to the ends thereof discs 80, each having a projection 81 extending therefrom which abut suitable stops 82 carried by the bearing plate 83. Springs 84 return the shafts to normal position after the shafts have been rotated.

It will be understood that the foregoing description deals exclusively with details of construction and arrangement of parts, however, the following description is intended to define the method of operation of the invention.

Figure 35:
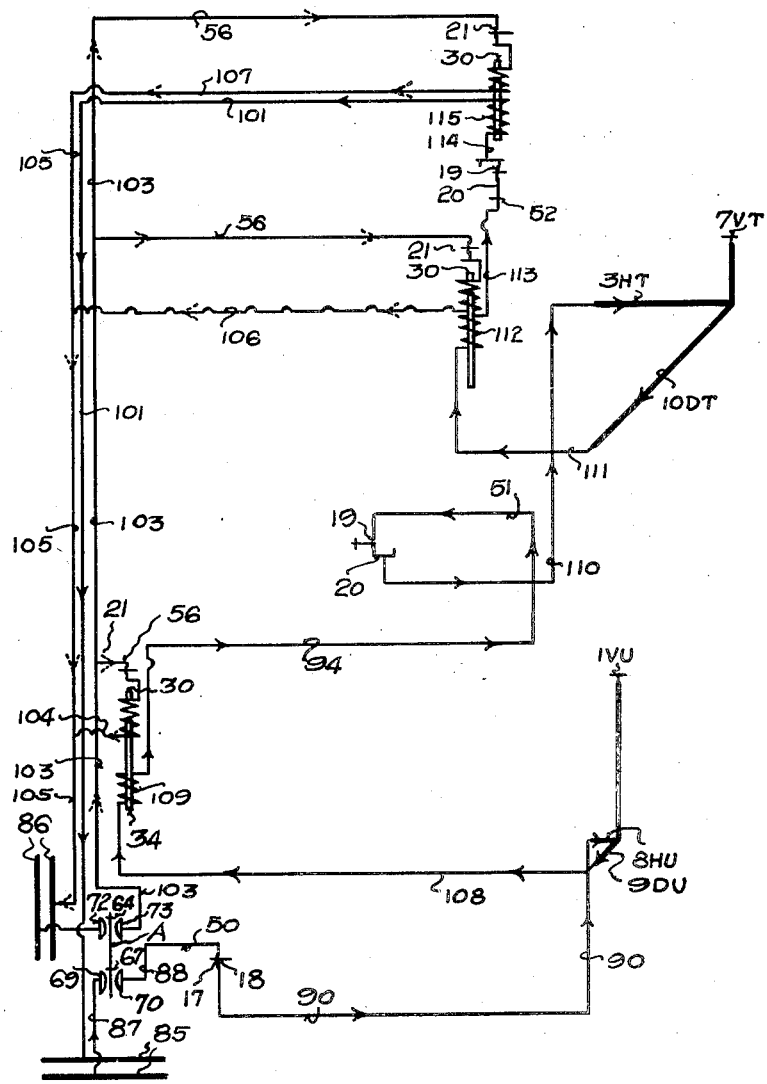
Figure 35 shows the circuits for adding a definite quantity to that already in the machine.

Accordingly, Figure 33 represents a complete wiring diagram with the exception of the clearing circuit separately illustrated in Figure 30. Figures 34 and 35 illustrate the various keys, bars, wires, relays, coils, contacts and switches actuated and energized during the example of addition of 71 to 38.

Referring primarily to Figure 33, the heavy lined rectangles to the right of the figure represent diagrammatically the horizontal and diagonal bars and key stems. The upper of the rectangles represents the tens column shown in Figures 5 and 8, while the lower rectangle represents the units column shown in Figures 1, 4 and 23. It is pointed out that current travels only along the horizontal and diagonal bars of the columns and does not travel along the heavy vertical lines which represent the key stems in the rectangles.

A current source 85 is shown at the lower left of Figures 33 and 34 and 35, which supplies the operating current for addition. A separate source 86 is also shown which supplies current to the relays 21. The addition key bears the same reference character "A" as applied thereto in the description of the control key column and is diagrammatically shown in Figures 33, 34 and 35.

In carrying out the example with the machine clear, the "3" key in the tens column and the 8 key in the units column are first depressed (see Figure 34). The respective key stems are designated 3VT and 8VU. Next the addition key "A" is depressed. Current then enters the machine through wire 87 from the source 85 through contact points 69 and 70 on the addition key, thence through wire 88, plate 50, contact points 17 and 18, wire 89 to the unit column. It will be observed that current flows through contact points 17 and 18 at the extreme right, since these are the contacts which are closed when the machine is clear. Current now flowing through wire 89 next enters bar OHU.

The 8VU key stem being depressed, current is allowed to pass from OHU through 8DU, (see Figure 34). Current then flows through wire 91 to winding 92 of the magnet 22 corresponding to a value of 8.

As soon as current flows through coil 92, the armature 30 is drawn within the coil and its relay 21 is closed. However, armature 34 remains in inoperative or down position temporarily, as explained in the description of mechanical structure. This is necessary in order to prevent the closing of a circuit which would have resulted in the closing of still other circuits and ultimately all of the answer bars would have been actuated.

Current then flows through wires 93, 94 and into the horizontal bar 51 of the next higher (tens) order. The switch composed of pins and contacts 19 and 20 is normally closed when the machine is clear. Current is free to flow to the tens column through wire 95 into horizontal bar OHT. As previously explained, the "3" key in the tens column has been depressed. Current then flows through diagonal bar 3DT, thence through wire 96 to energize coil 97 of the magnet 22 corresponding to a value of 3.

The coil 97 being energized as explained, the armature 30 is actuated to close its relay switch 21. Current now flows through wire 98, along wire 99 to the bar 51 of the next higher (hundreds) order, through points 19 and 20 corresponding to zero, thence to coil 100 of the magnet 22 corresponding to a value of zero. The corresponding armature 30 is actuated to close its relay switch 21. Current then flows through wire 101 back to source at 85.

The relay circuit is traced as follows: 86 represents the source and it being remembered that the addition key A has been depressed and contact made at 72 and 73, (see Figure 34) current flows through wire 102, wire 103 and through bar 56, through the relay switch 21 which corresponds to the numeral "8" in the units answer column, through the attendant coil, thence through wire 104 back to source 86 through wire 105.

In parallel with the circuit just described, current flows through wire 103 to bar 56 of the tens column, through the relay switch 21, which corresponds to the numeral "3" in the tens column; through the attendant coil, thence through wire 106 back to the source 86 through wire 105.

Also in parallel with the two relay circuits just described, current passes through the wire 103 to the bar 56, of the hundreds column, through the relay 21 which corresponds to the numeral "0" in the hundreds column. Current continues through the attendant coil, thence through wire 107 back to source 86 through wire 105. This completes the relay circuits.

As key "A" is pressed farther down the contacts made at 69 and 70 are broken for the pin 67 passes by these contacts, but the contacts 72 and 73 remain intact. This causes current to continue flowing through the relay coils, the armatures 30 being retained in operative position. The relays 21 are now energized only by the current flowing through their own switches.

As the key "A" is pressed farther down (see Figure 27) the projection 77 engages the lug 79 on shaft 25, thereby rotating the latter which causes the answer retaining bar 27 to be moved longitudinally to allow the selected answer bars 37 (see Figures 15 and 16) corresponding to the numeral "3" in the tens column and "8" in the units column, to move upward. The selected magnets being now energized, due to the relay current described, armatures 34 operate to push upward the answer exhibiting bars 37. Simultaneously, the answer indicating bars 37, corresponding to zero, both in the units and tens column are drawn downward by the action of springs 41. (See Figure 17).

The answer bar 37 corresponding to the numeral zero in the hundreds column remains in the same position as before or raised position due to the action of the relay current described.

Due to the operations described, numerals "3" in the tens column and "8" in the units column are now exhibited in the spaces 39 (see Figure 9) by reason of placing 38 in the machine. Due to this operation in the units column contacts 17 and 18 corresponding to zero are broken and 17 and 18 corresponding to "8" are closed. In the tens column 19 and 20 corresponding to "0" are broken and 19 and 20 corresponding to "3" are closed, while 19 and 20 in the hundreds column remain closed.

The clearing of the key column is accomplished in the following manner: At the time projection 77, carried by the "A" key stem strikes the lug 79 on shaft 25, the projection 76 thereabove, (see Figure 27), strikes the lug 78 on the shaft 10. This action causes lugs 11, (see Figures 1, 4, 5 and 8) to engage the ends of bars 12, sliding the same longitudinally thereby to cause the depending projections 14 carried by the bar to engage the rollers 15, hence to push the key stems OVU, (Figures 1 and 4) and OVT, (Figures 5 and 8) downward so that the hooks 6 on their lower ends will engage in the slots in the locking bar 8, shown in detail in Figures 6 and 7. The key stem 8VU (Figures 1 and 4) and the key stem 3VT (Figures 5 and 8) are released by virtue of the longitudinal movement of bar 8 caused by downward movement of key stems OVU and OVT as above described. Addition key A is now released for its return to normal position. This action releases the shafts 10 and 25 to the tensing of springs 84 (Figures 28 and 31) which returns them to normal position. Also, longitudinally movable bars 12 and 27 are permitted to return to normal position by their respective springs 13 and 28. During this action the contacts 72 and 73 (Figures 27, 33 and 34) are still in contact and the relay coils continue to hold their switches in the closed position.

As the addition key is returned to normal position, no undesirable effects are produced. As this key moves upward, its projections 76 and 77, Figure 27, release the lugs 78 and 79 on the shafts 10 and 25 respectively. The effect of this action is to allow rotation of the rods 10 and 25. When the rod 10 is thus rotated the key release bars 12 are released to the action of their springs 13, and they move to inoperative position. When the rod 25 is allowed to rotate the answer retaining bars 27 are released to the action of their springs 28, and the answer bars 37 which have been raised are mechanically locked in exhibiting position.

Referring to Figure 28, it will be seen that as the A key is returned to the normal position, contact continues to be made between springs 72 and 73 by the pin 64 for a considerable part of the up stroke. During this time the relays continue to be energized through their circuits, but the answer retaining bars are effective during this time to prevent the raising of additional answer exhibiting bars 37. Near the end of the up stroke of the A key, the relay circuit is broken. It will be observed in Figure 28 that the addition current is again allowed to flow near the end of the up stroke of the A key by reason of contact between springs 69 and 70 by pin 67. This current, however, is not effective to alter the answer already obtained since it flows only through the zero key stems.

It will now be described how "71" is added to the "38" now in the machine. The "7" key, in the tens column is now pressed and the "1" key in the units column. It will be understood that as soon as these key stems are lowered, the key stems OVT and OVU are released from locked engagement with the lock bar 8.

Referring to Figure 35, key "A" is now pressed and current enters the machine from source 85 through wire 87 thence through contacts 69 and 70, thence to bar 50 and to the contacts 17 and 18, corresponding to a value of "8", thence through wire 98, to the horizontal bar 8HU. Key stem IVU being depressed, current flows from 8HU to diagonal bar 9DU, thence through wire 108 to coil 109. This coil corresponds to the numeral "9" in the units column. The armature 30 is actuated to close its switch.

Current now flows through wire 94 to bar 51 in the tens column thence through contacts 19 and 20, corresponding to a value of "3", thence through wire 110 to horizontal bar 3HT, thence to diagonal bar IODT. Current flows from bar IODT through wire 111 to coil 112 on the magnet 22 in the tens column corresponding to zero. The armature 30 is actuated to close its relay switch. Current now passes through wire 113 to bar 52, thence through contact points 19 and 20 corresponding to "1". It will be noted that the current enters the bar 52 instead of the bar 51 as in the tens column. (See Figure 33.) This is effected since "one" is being carried to be added to "0" of the hundreds column to secure the numeral "1" in the answer sought, namely "109". Referring to Figure 33, it will be noted that the tens column is connected to the hundreds column by two wires, 122 and 124. Had there been no carrying, current would have flowed from the tens bank through wire 119 to coil 120, and thence to plate 51 of the hundreds column by way of wires 121 and 122. Similar connection is made between the units column and the tens column by wires 94 and 116, 94 being the non-carry wire, and 116 the carry wire.

Current now passes from contacts 19 and 20, wire 114, to coil 115 on one of the magnets 22 corresponding to "one" of the hundreds. Current now passes from coil 115 through wire 101 and back to source 85.

It will be seen that carrying is effected simultaneously with adding in all columns, since the adding current flows in series through the units bank, the units exhibitor coils, the tens bank, the tens exhibitor coils etc.

Referring now to the relay circuits, current passes from the source 86 through contacts 72 and 73, to the wire 103, bar 56 of the units column, through relay 21, through the attendant coil, thence through wire 104 to wire 105 and back to the source 86.

In parallel with this circuit, current flows through wire 103 to bar 56 of the tens column to the relay switch and thence through the attendant coil, thence through wires 106 and 105, back to source 86.

Also in parallel with these two circuits, current flows through wire 103, bar 56 in the hundreds column, through the relay 21, through the attendant coil, thence through wires 107 and 105 back to the source 86.

As described above, contacts 69 and 70 are broken as soon as the contact pin 67 passes by the contacts but the relay contacts 72 and 73 remain intact during the full downward stroke of the key stem "A".

After breaking the contact formed at 72 and 73, the projection 77, (Figure 27) strikes the lug 79 on the shaft 25, causing the shaft to rotate, bringing lugs 26 against the upturned end of the answer retaining bars 27, (see Figure 10), and thereby moving the same to the right. This causes the answer bar 37, corresponding to "1" in the hundreds column to move upward through action of the relay current. The same is true of the "0" in the tens column and the "9" in the units column. At the same time, the "0" in the hundreds column, the "3" in the tens column and the "8" in the units column are released to the action of their springs 41 for return to lowered position.

Simultaneously with the above action, the projection 78 on the "A" key stem strikes the lug 78 on shaft 10, rotating the same, thereby moving the key release bars 12 longitudinally and through the medium of the depending projection 14 carried thereby and cooperating roller 15 (Figure 4), the key stem CVU is depressed and its hook 6 releases key stems IVU and 7VT for return to inoperative position. The A key is now returned to its normal position as previously described.

The addition of "71" to "38" is now completed and the sum "109" representing the answer is exhibited in the spaces 39 provided in the machine, as shown in Figure 9.

In Figure 30 is shown the circuit controlling the clearing of the answer exhibiting mechanism, referred to briefly in the foregoing. Current for this circuit is derived from source 86 through wire 102, through contacts 131 and 132 to wire 133, thence through wire 134 (see Figure 30) to coil 135 and back to source 86 through wires 136 and 137. This coil is one of the four coils on the zero magnet of the units answer exhibiting mechanism, which has not been previously mentioned, there being only three coils represented in the diagram in Figure 33. This coil serves to energize the zero magnet to effect actuation of the zero answer bar, as described.

In parallel with this circuit, current passes from wire 133 to wire 138, (see Figure 30) thence to coil 139 and back to source 86 through wires 140 and 137. This coil is one of the four coils on the zero magnet of the tens answer exhibiting mechanism and serves to energize the zero magnet in the tens column.

Also in parallel with the two circuits just described current passes through wire 133, through wire 141 to coil 142 (see Figure 30) and back to source 86 through wires 143 and 137. This coil also was not mentioned in the general description but is effective in energizing the zero magnet in the hundreds column.

The circuits just described remain intact during the full downward stroke of "C" or clearing key. Near the end of the stroke of said key, its projection, corresponding to the projection 77 of the A key, (see Figure 27) strikes a lug on shaft 25, corresponding to lug 79 (see Figure 27) to rotate the shaft to thereby move the answer retaining bar 27 longitudinally to release the zero answer exhibiting bars 37. It will be remembered that the "C" key has only a single projection corresponding to projections carried by the A key.

When the zero answer bars 37 are released as explained, they are free to move upward by magnet action. At the same time, any answer bar whose roller 29 is above the bar 27 is released to move downward. Such action causes the zero contacts to be made to prepare the machine to receive further problems of addition and zero signs are exhibited in the spaces 39, see Figure 9.

Manifestly, the construction shown is capable of considerable modification and such modification as is considered within the scope and meaning of the appended claims is also considered within the spirit and intent of the invention.

I claim:

1. An electric adding machine including a plurality of key columns and correlated unitary answer exhibiting means interrelated by electrical circuits in series through said key columns and said answer exhibiting means, relay means for establishing selective current paths through said columns preparatory to exhibiting a result, and means whereby to actuate selected units of said exhibiting means.

2. An adding machine including a plurality of key columns interrelated in series by electric circuits, a unitary answer exhibiting means, in said series circuits, said key columns and said answer exhibiting means being arranged to select units of said answer exhibiting means for actuation, and said circuits being adapted to effect carrying simultaneously with adding in all columns, and means to actuate said units.

3. An electric adding machine including a plurality of key columns and correlated answer exhibiting means interrelated by electrical circuits in series, relay means for establishing current paths through said columns, and means to close said current paths.

4. An electric adding machine comprising key columns and answer exhibiting means, said key columns and answer exhibiting means being electrically connected in series and adapted to determine the path of an electric current, whereby simultaneous adding and carrying in all columns may be effected at the same time, relay means for retaining a value in said exhibiting means, and means to close said current path.

5. An electrical adding machine including a system of electrical circuits of value in series, a plurality of key stems operating to close selective circuits in said system, answer exhibiting means included in said system, means operative upon the closing of said circuits to prepare said latter means to exhibit the answer and means for actuating said latter means to complete the exhibiting operation of addition, said system being adapted to effect carrying simultaneously with the adding operation concurrently in all columns.

6. An electrical adding machine including a plurality of key banks and an answer exhibitor for each digital order, each key bank and its corresponding answer exhibitor being arranged to select a unit of said answer exhibitor for actuation, said key banks and answer exhibitors of all digital orders being electrically connected in series whereby to effect simultaneous adding and carrying in all columns concurrently, and means for actuating said selected units.

FELIX B. WADEL.